United States Patent [19]
Toriyama

[11] Patent Number: 5,111,209
[45] Date of Patent: May 5, 1992

[54] SATELLITE-BASED POSITION DETERMINING SYSTEM

[75] Inventor: Ichiro Toriyama, Kanagawa, Japan

[73] Assignee: Sony Corporation, Tokyo, Japan

[21] Appl. No.: 703,202

[22] Filed: May 20, 1991

[30] Foreign Application Priority Data

May 23, 1990 [JP] Japan .................................. 2-133231

[51] Int. Cl.$^5$ .......................... H04B 7/185; G01S 5/02
[52] U.S. Cl. .................................... 342/357; 342/457; 364/449
[58] Field of Search ....................... 342/357, 457, 356; 364/449; 340/988, 991, 995

[56] References Cited

U.S. PATENT DOCUMENTS 4,918,609  4/1990  Yamawaki ........................... 364/449
5,017,926  5/1991  Ames et al. ......................... 342/357

Primary Examiner—Theodore M. Blum
Attorney, Agent, or Firm—Philip M. Shaw, Jr.

[57] ABSTRACT

Disclosed herein is a transmission system for determining a position of a mobile station by using communication satellites. The determination of the position of the mobile station is effected by one-line signal transmission from the mobile station through one satellite to a fixed station and by two-line signal transmission from the fixed station through two satellites to the mobile station. Thus, the construction of the transmission system can be made simple such that a transmitter for the one-line signal transmission needs to be mounted on the mobile station.

3 Claims, 5 Drawing Sheets

F I G. 5
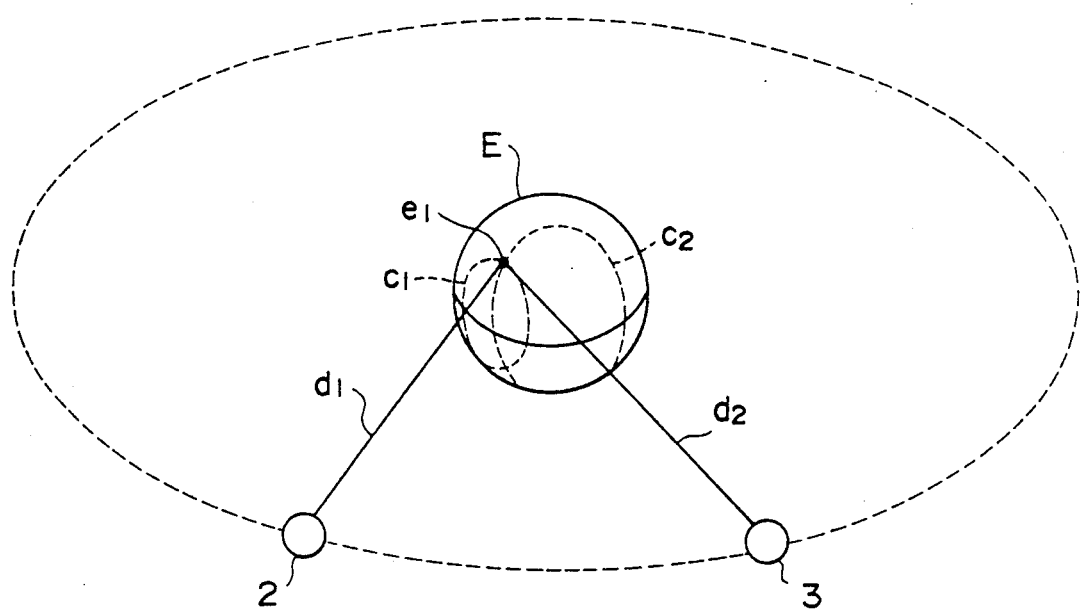

SATELLITE-BASED POSITION DETERMINING SYSTEM

BACKGROUND OF THE INVENTION

The present invention relates to a transmission system for determining a position of a mobile station by using communication satellites.

Conventionally, a position of a mobile station, which incorporated in a vehicle such as an automobile or a ship or an aircraft, is determined by using communication satellites. In the case of using three or more communication satellites, signals from these satellites are received by the mobile station. Then, on the basis of information obtained from receiving timings, a linear equation with four unknowns is solved to thereby calculate the position of the mobile station. This position determining system requires many satellites, and the mobile station requires to be equipped with a number of receivers corresponding to these satellites. Furthermore, it is necessary that precise computation for the position determination is to be carried out in the mobile station.

In contrast, there has been proposed in U.S. Pat. No. 4,839,656, for example, a position determining system employing two geostationary satellites and carrying out the computation for the position determination in a fixed station on the ground.

This known position determining system is constructed as illustrated in FIG. 3, for example. Referring to FIG. 3, reference numeral 1 designates a mobile station such as a truck whose present position is intended to be determined. The mobile station 1 is provided with a receiver for receiving a radio wave from a first geostationary satellite 2, a first transmitter for transmitting a radio wave to the first geostationary satellite 2, and a second transmitter for transmitting a radio wave to a second geostationary satellite 3. On the other hand, a fixed station 4 on the ground is provided with a transmitter for transmitting a radio wave to the first geostationary satellite 2, a first receiver for receiving a radio wave from the first geostationary satellite 2, and a second receiver for receiving a radio wave from the second geostationary satellite 3. Additionally, another fixed station 5 for calibrating the position of the mobile station 1 is located at a position remote from the fixed station 4. The position calibrating fixed station 5 is provided with a receiver for receiving a radio wave from the first geostationary satellite 2, a first transmitter for transmitting a radio wave to the first geostationary satellite 2, and a second transmitter for transmitting a radio wave to the second geostationary satellite 3.

Next, a procedure for determining a position of the mobile station 1 will be described with reference to FIG. 4. First, a synchronizing signal precisely managed in time is transmitted from the fixed station 4 to the first geostationary satellite 2. This synchronizing signal is relayed by the first geostationary satellite 2, and is then received by the receiver mounted on the mobile station 1. In regard to the transmission of the synchronizing signal from the fixed station 4 through the first geostationary satellite 2 to the mobile station 1, reference character $t_1$ denotes a time required for transmitting the synchronizing signal to the fixed station 4 to the first geostationary satellite 2, and reference character $t_2$ denotes a time required for transmitting the synchronizing signal from the first geostationary satellite 2 to the mobile station 1.

After a predetermined time $t_0$ has elapsed from a receiving timing of this synchronizing signal at the mobile station 1, a first packet signal containing an ID number of a terminal in the mobile station 1 and also containing information contained in an input signal is transmitted from the mobile station 1 to the first geostationary satellite 2. At the same time, i.e., after the predetermined time $t_0$ has elapsed from the receiving timing of this synchronizing signal, a second packet signal similar to the first packet signal is transmitted from the mobile station 1 to the second geostationary satellite 3. The above predetermined time $t_0$ is a constant value, and information of this time $t_0$ is preliminarily stored in the fixed station 4. In regard to the transmission of these packet signals from the mobile station 1 to the first and second geostationary satellites 2 and 3, reference character $t_2'$ denotes a time required for transmitting the first packet signal from the mobile station 1 to the first geostationary satellite 2, and reference character $t_3$ denotes a time required for transmitting the second packet signal from the mobile station 1 to the second geostationary satellite 3.

The first and second packet signals are relayed by the first geostationary satellite 2 and the second geostationary satellite 3, respectively, and are then received by the fixed station 4. In regard to the transmission of these packet signals from the first and second geostationary satellites 2 and 3 to the fixed station 4, reference character $t_1'$ denotes a time required for transmitting the first packet signal from the first geostationary satellite 2 to the fixed station 4, and reference character $t_4$ denotes a time required for transmitting the second packet signal from the second geostationary satellite 3 to the fixed station 4.

Thereafter, in the fixed station 4, a distance between the first geostationary satellite 2 and the mobile station 1 is calculated from a receiving timing of the first packet signal received from the first geostationary satellite 2, a transmitting timing of the synchronizing signal transmitted from the fixed station 4, and a distance between the fixed station 4 and the first geostationary satellite 2. Similarly, a distance between the second geostationary satellite 3 and the mobile station 1 is calculated from a receiving timing of the second packet signal received from the second geostationary satellite 3, the transmitting timing of the synchronizing signal, and a distance between the fixed station 4 and the second geostationary satellite 3. More specifically, the distance between the fixed station 4 and the first geostationary satellite 2 is a fixed value, and the distance between the fixed station 4 and the second geostationary satellite 3 is also a fixed value. Therefore, these distances can be preliminarily determined in the fixed station 4. Accordingly, the transmission time $t_1$ and the transmission time $t_1'$ between the fixed station 4 and the first geostationary satellite 2 can be determined from the above fixed distance between the fixed station 4 and the first geostationary satellite 2. Similarly, the transmission time $t_4$ between the fixed station 4 and the second geostationary satellite 3 can be determined from the above fixed distance between the fixed station 4 and the second geostationary satellite 3. In this case, the time $t_1$ is equal to the time $t_1'$ because the distance between the fixed station 4 and the first geostationary satellite 2 is fixed. The remaining transmission times $t_2$, $t_2'$ and $t_3$ varies with a position of the mobile station 1. As to the transmission times $t_2$ and $t_2'$, since the transmission between the mobile station 1 and the first geostationary satellite 2 is carried out in the same distance, the transmission times $t_2$ and $t_2'$ are equal to each other. Accordingly, the transmission time $t_2$ ($=t_2'$) can be calculated by subtracting the known times $t_1$, $t_1'$ and $t_0$ from a total time $t_a$ required for the transmission from the transmitting timing of the synchronizing signal to the receiving timing of the packet signal via the first geostationary satellite 2. After thus determining the transmission time $t_2$, the transmission time $t_3$ can be calculated by subtracting the known times $t_1$, $t_2$, $t_4$ and $t_0$ from a total time $t_b$ required for the transmission from the transmitting timing of the synchronizing signal to the receiving timing of the second packet signal via the second geostationary satellite 3.

After thus calculating these transmission times $t_2$ and $t_3$, information of the times $t_2$ and $t_3$ is converted into information of distances on the basis of a transmission rate, thus obtaining the distance between the mobile station 1 and the first geostationary satellite 2 and the distance between the mobile station 1 and the second geostationary satellite 3. Then, on the basis of these two distances and information of precise positions of the first and second geostationary satellites 2 and 3, a two-dimensional position of the mobile station 1 is calculated in the fixed station 4.

Then, by using this two-dimensional position calculated above and a data base of a terrain map provided in the fixed station 4, a three-dimensional position of the mobile station 1 is calculated.

A manner of calculating the three-dimensional position of the mobile station 1 in the fixed station 4 will now be described with reference to FIG. 5. Referring to FIG. 5, reference character $d_1$ denotes a distance between the mobile station 1 and the first geostationary satellite 2 which exists on a predetermined orbit, and reference character $d_2$ denotes a distance between the mobile station 1 and the second geostationary satellite 3 which also exists on the above predetermined orbit. A point on the earth E remote from the first geostationary satellite 2 by the distance $d_1$ describes a circle $c_1$, and a point on the earth E remote from the second geostationary satellite 3 by the distance $d_2$ describes a circle $c_2$. Accordingly, two intersections $e_1$ between the circles $c_1$ and $c_2$ exist on the earth E, one of which intersections $e_1$ existing on the northern hemisphere, while the other existing on the southern hemisphere. A coordinate position of each intersection $e_1$ can be determined from the data base of the terrain map.

Further, in carrying out the calculation of the coordinate position of the mobile station 1, the transmission of signals may be carried out between the fixed station 4 and the position calibrating fixed station 5 in each service area via the first and second geostationary satellites 2 and 3, so as to calibrate the above calculated coordinate position according to the signal returned to the position calibrating fixed station 5.

In the above prior art transmission system for determining a position of the mobile station 1, it is necessary to carry out the two-line inbound transmission from the mobile station 1 to the fixed station 4 and the one-line outbound transmission from the fixed station 4 to the mobile station 1. That is, the mobile station 1 needs to have two sets of transmitters consisting of the first transmitter for transmitting a radio wave to the first geostationary satellite 2 and the second transmitter for transmitting a radio wave to the second geostationary satellite 3. In general, such a transmitter for transmitting a radio wave to a geostationary satellite requires a relatively large transmission antenna, for example. Accordingly, it is not easy to mount the two sets of transmitters on a relatively small mobile station such as an automobile. Further, this prior art transmission system requires two geostationary satellites for relaying relatively small power radio waves from the mobile station, causing an increase in cost for the construction of the system.

SUMMARY OF THE INVENTION

It is accordingly an object of the present invention to provide a transmission system which can determine a position of a mobile station with a simple construction such that one-line signal transmission from the mobile station is needed.

According to the present invention, there is provided a transmission system for determining a position of a mobile station comprising means provided in said mobile station for transmitting a position determination signal from said mobile station through a first geostationary satellite to a fixed station; means provided in said fixed station for receiving said position determination signal; means provided in said fixed station for transmitting a first reference signal through said first geostationary satellite to said mobile station; means provided in said fixed station for transmitting a second reference signal through a second geostationary satellite to said mobile station; means provided in said mobile station for receiving said first reference signal; means provided in said mobile station for receiving said second reference signal; means provided in said mobile station for measuring a first period of time from a transmitting timing of said position determination signal to a receiving timing of said first reference signal and measuring a second period of time from the transmitting timing of said position determination signal to a receiving timing of said second reference signal; said transmitting means provided in said mobile station transmitting information of said first and second periods of time measured above through said first geostationary satellite to said fixed station; and means provided in said fixed station for computing the position of said mobile station according to the information of said first and second periods of time transmitted above.

With this construction, the determination of the position of the mobile station is effected by one-line signal transmission from the mobile station through one satellite to a fixed station and by two-line signal transmission from the fixed station through two satellites to the mobile station. Thus, the construction of the transmission system can be made simple such that a transmitter for the one-line signal transmission needs to be mounted on the mobile station. Furthermore, only one satellite for relaying the signal transmission from the mobile station to the fixed station is necessarily used to effectuate precise determination of the position with a simple construction.

Other objects and features of the invention will be more fully understood from the following detailed description and appended claims when taken with the accompanying drawings.

BRIEF DESCRIPTION OF THE DRAWINGS

FIG. 5 is a schematic illustration for explaining a manner of calculation of a position of a mobile station.

DETAILED DESCRIPTION OF THE PREFERRED EMBODIMENT

There will now be described a preferred embodiment of the present invention with reference to FIGS. 1 and 2.

Figure 1:
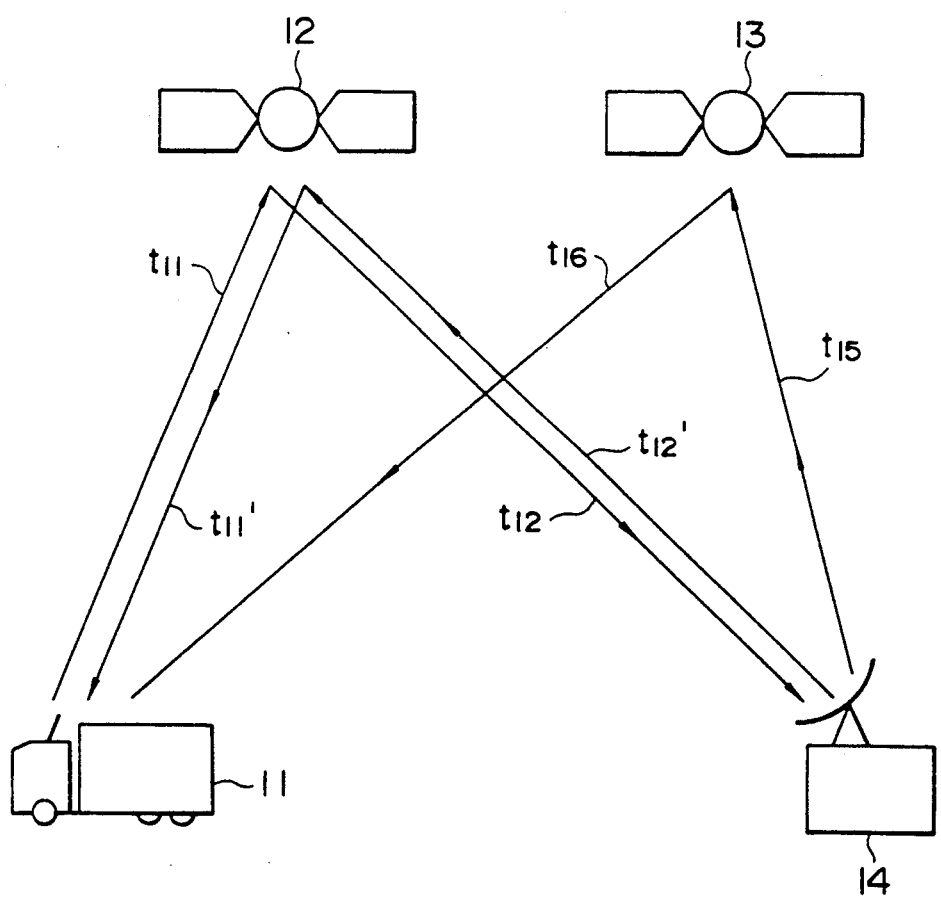
FIG. 1 is a schematic illustration of the construction of the transmission system according to a preferred embodiment of the present invention.

In this preferred embodiment, determination of a position of a mobile station is carried out by a transmission system as shown in FIG. 1. Referring to FIG. 1, reference numeral 11 designates a mobile station such as a truck whose position is to be determined. The mobile station 11 is provided with a first receiver for receiving a radio wave from a first geostationary satellite 12, a second receiver for receiving a radio wave from a second geostationary satellite 13, and a transmitter for transmitting a radio wave to the first geostationary satellite 12. In this case, the transmission from the mobile station 11 to the first geostationary satellite 12 is carried out with a frequency band of 1.6 GHz, for example, and the transmission from each of the first geostationary satellite 12 and the second geostationary satellite 13 to the mobile station 11 is carried out with a frequency band of 4 GHz, for example. Further, a fixed station 14 on the ground is provided with a first transmitter for transmitting a radio wave to the first geostationary satellite 12, a second transmitter for transmitting a radio wave to the second geostationary satellite 13, and a receiver for receiving a radio wave from the first geostationary satellite 12.

Next, a procedure for determining a position of the mobile station 11 will be described with reference to FIG. 2. First, when a present position of the mobile station 11 is intended to be determined, a position determination signal is transmitted from the mobile station 11 to the first geostationary satellite 12. At this time, a transmitting timing of the position determination signal is stored in the mobile station 11. In regard to this transmission, reference character $t_{11}$ denotes a time required for the transmission of the position determination signal from the mobile station 11 to the first geostationary satellite 12.

Then, the position determination signal relayed by the first geostationary satellite 12 is received by the receiver in the fixed station. In regard to this transmission, reference character $t_{12}$ denotes a time required for the transmission of the position determination signal from the first geostationary satellite 12 to the fixed station 14. When the position determination signal is received by the receiver in the fixed station 14 as mentioned above, a first reference signal containing a predetermined identification signal is transmitted from the first transmitter in the fixed station to the first geostationary satellite 12 after a predetermined time $t_{13}$ has elapsed. At the Same time, a second reference signal containing a predetermined identification signal is transmitted from the second transmitter in the fixed station 14 to the second geostationary satellite 13 after a predetermined time $t_{14}$ has elapsed. In regard to the transmission from the fixed station 14 to the first geostationary satellite 12 and the second geostationary satellite 13, reference character $t_{12}'$ denotes a time required for the transmission of the first reference signal from the fixed station 14 to the first geostationary satellite 12, and reference character $t_{15}$ denotes a time required for the transmission of the second reference signal from the fixed station 14.

Then, the first reference signal relayed by the first geostationary satellite 12 is received by the first receiver in the mobile station 11, while the second reference signal relayed by the second geostationary satellite 13 is received by the second receiver in the mobile station 11. In the mobile station 11, it is determined which of the first and second reference signals has been relayed by either the first geostationary satellite 12 or the second geostationary satellite 13 according to the identification signals contained in the reference signals received. In regard to the transmission from the first geostationary satellite 12 and the second geostationary satellite 13 to the mobile station 11, reference character $t_{11}'$ denotes a time required for the transmission of the first reference signal from the first geostationary satellite 12 to the mobile station 11, and reference character $t_{16}$ denotes a time required for the transmission of the second reference signal from the second geostationary satellite 13 to the mobile station 11.

Figure 2:
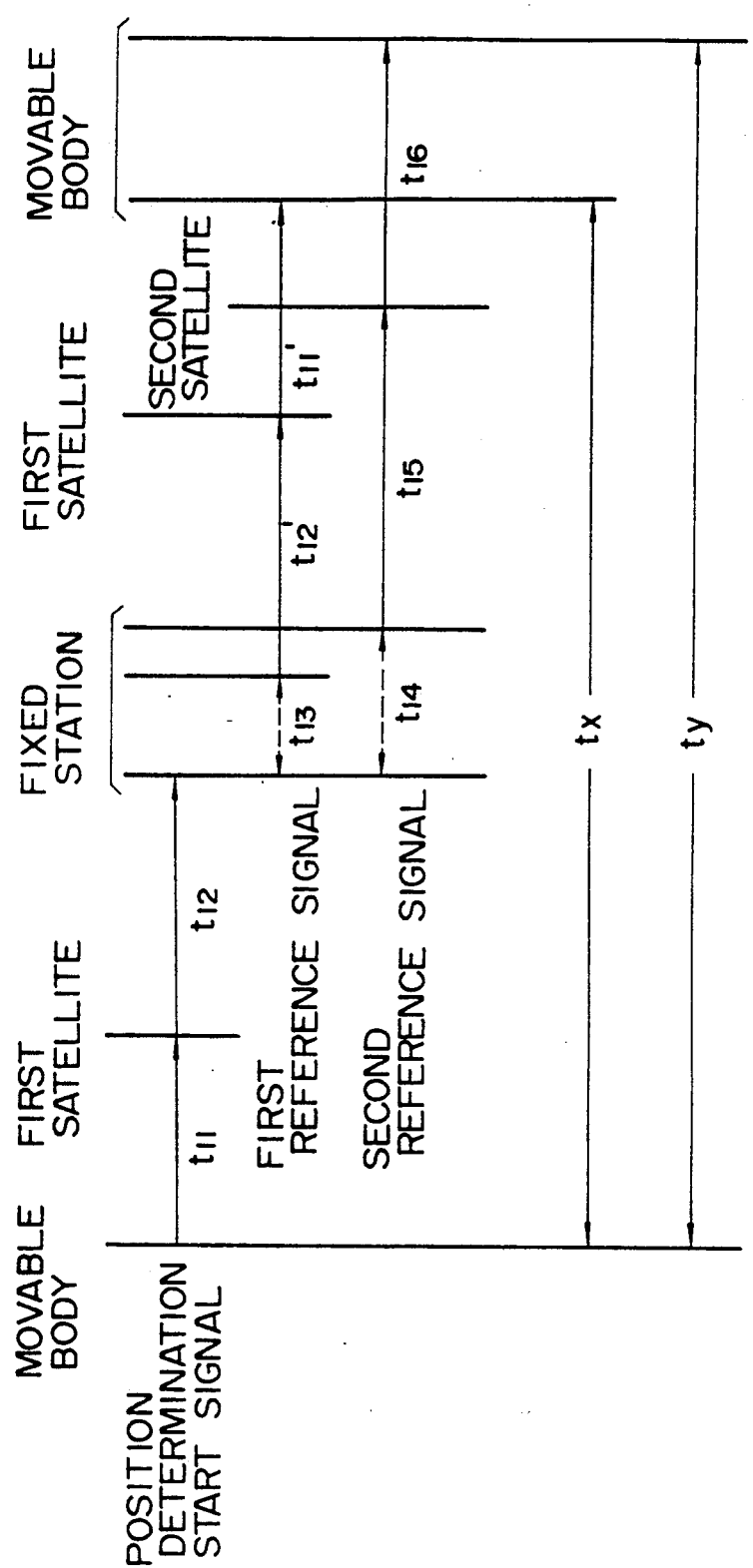
FIG. 2 is a timing chart for explaining the transmission of signals in the transmission system shown in FIG. 1.
Figure 3:
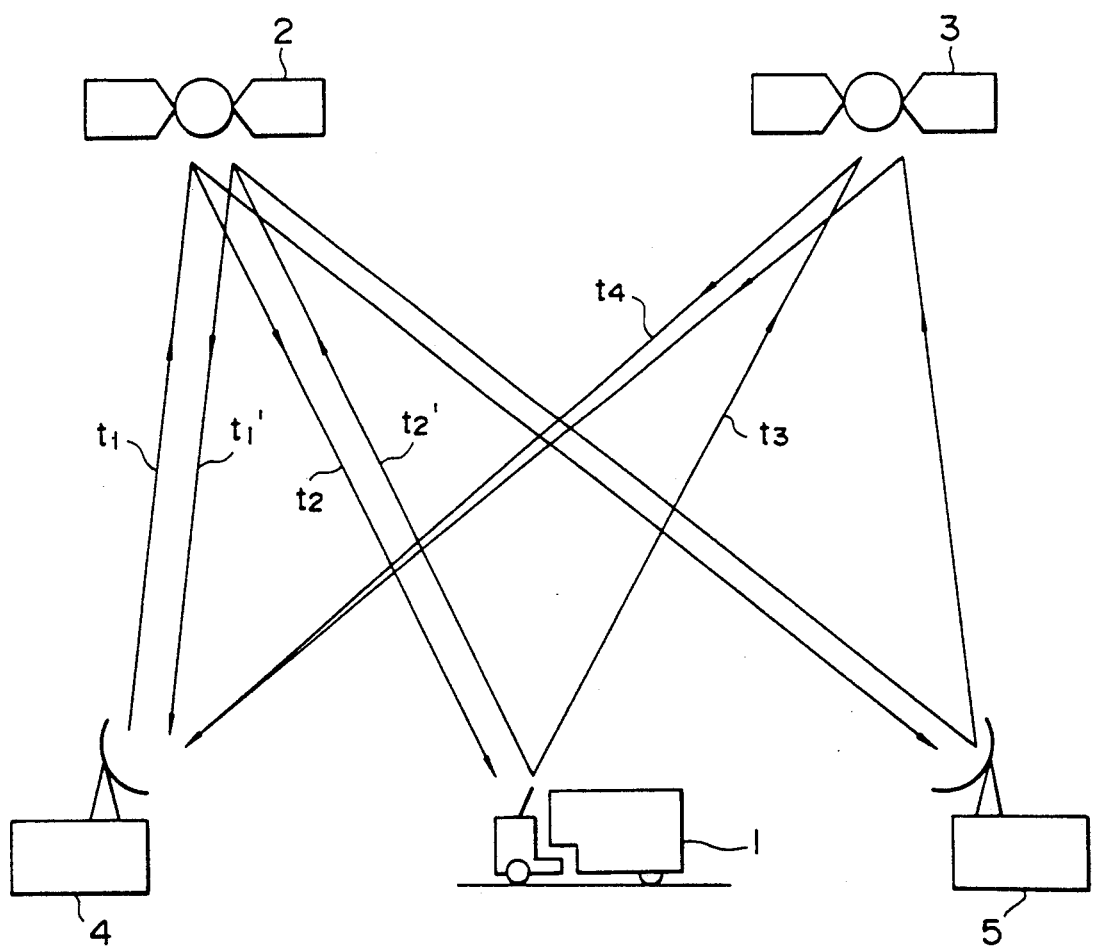
FIG. 3 is a schematic illustration of the construction of the transmission system in the prior art.
Figure 4:
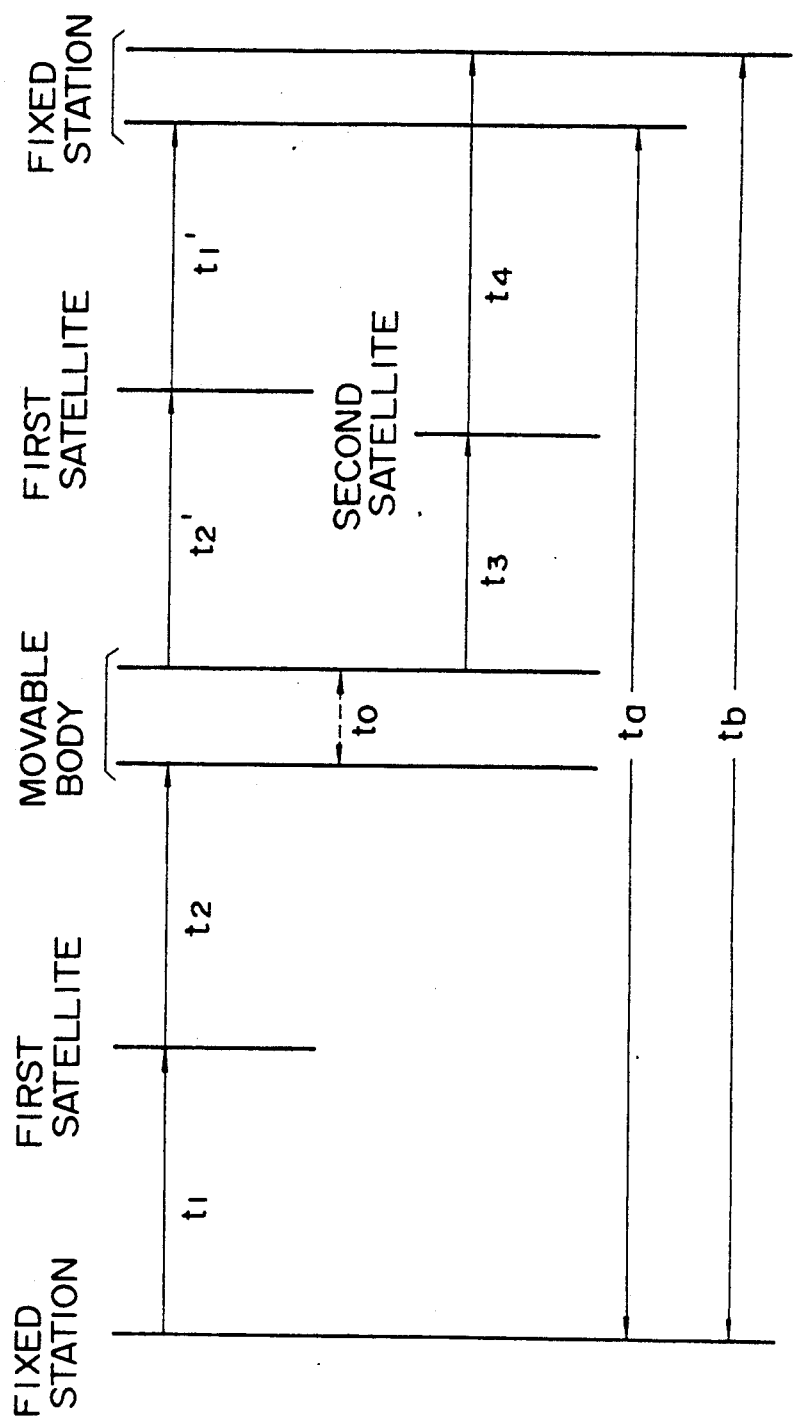
FIG. 4 is a timing chart of explaining the transmission of signals in the transmission system shown in FIG. 3.

As shown in FIG. 2, reference character $t_x$ denotes a total time required for the transmission from the transmitting timing when the position determination signal is transmitted from the mobile station 11 to a receiving timing when the first reference signal is received by the mobile station 11, while reference character $t_y$ denotes a total time required for the transmission from the transmitting timing when the position determination signal is transmitted from the mobile station 11 to a receiving timing when the second reference signal is received by the mobile station 11. Both the total time $t_x$ and the total time $t_y$ are measured by a measuring means in the mobile station 11.

In the next step, information of the total time $t_x$ and the total time $t_y$ measured above is transmitted from the mobile station 11 through the first geostationary satellite 12 to the fixed station 14. Subsequently, in the fixed station 14, a distance between the first geostationary satellite 12 and the mobile station 11 is calculated from the total time $t_x$, and a distance between the second geostationary satellite 13 and the mobile station 11 is calculated from the total time $t_y$. More specifically, a distance between the fixed station and the first geostationary satellite 12 is a fixed value, and a distance between the fixed station 14 and the second geostationary satellite 13 is also a fixed value. Therefore, these distances can be preliminarily determined in the fixed station 14. Accordingly, the transmission time $t_{12}$ and the transmission time $t_{12}'$ between the fixed station 14 and the first geostationary satellite 12 can be determined from the above fixed distance between the fixed station 14 and the first geostationary satellite 12. Similarly, the transmission time $t_{15}$ between the fixed station 14 and the second geostationary satellite 13 can be determined from the above fixed distance between the fixed station 14 and the second geostationary satellite 13. The remaining transmission times $t_{11}$, $t_{11}'$ and $t_{16}$ varies position of the mobile station 11. As to the transmission times $t_{11}$ and $t_{11}'$, since the transmission between the mobile station 11 and the first geostationary satellite 12 is carried out in the same distance, the transmission times $t_{11}$ and $t_{11}$ are equal to each Other. Accordingly, the transmission time $t_{11}$ ($=t_{11}'$) can be calculated by subtracting the known times $t_{12}$, $t_{12}'$ and $t_{13}$ from the total time $t_x$.

Similarly, the transmission time $t_{16}$ can be calculated by subtracting the known times $t_{12}$, $t_{14}$ and $t_{15}$ and the above calculated time $t_{11}$ from the total time $t_y$.

After thus calculating the transmission times $t_{11}$ and $t_{16}$ is converted into information of distances on the basis of a transmission rate, thus obtaining the distance between the mobile station 11 and the first geostationary satellite 12 and the distance between the mobile station 11 and the second geostationary satellite 13. Then, on the basis of these two distances and information of precise positions of the first and second geostationary satellites 12 and 13, a two-dimensional position of the mobile station 11 is calculated in the fixed station 14. Then, by using information of this two-dimensional position calculated above and a data base of a terrain map provided in the fixed station 14, a three-dimensional position of the mobile station 11 is calculated. The calculation of the three-dimensional position of the mobile station 11 is carried out in the same manner as in the prior art. Further, in carrying out the calculation of the coordinate position of the mobile station 11, another fixed station for position calibration (not shown) may be provided in each service area, so as to carry out the transmission of signals between the fixed station 14 and the position calibrating fixed station via the first and second geostationary satellites 12 and 13 and calibrate the above calculated coordinate position according to the signal returned to the position calibrating fixed station, thereby more precisely determining the position.

According to the preferred embodiment as described above, the position of the mobile station 11 can be determined by the one-line transmission from the mobile station 11 via the first geostationary satellite 12 and the two-line transmission from the fixed station 14 via the second geostationary satellite 13. Accordingly, it is sufficient to have the mobile station 11 be equipped with a single transmitter for the one-line transmission via the first geostationary satellite 12, thereby making compact a position determining device to be equipped in the mobile station 11. In general, such a transmitter for the transmission to a geostationary satellite requires a large-sized transmission antenna. However, since a single transmitter is only necessary as the transmitter to be provided in the mobile station 11 according to the present invention, the position determining device can be installed in a small space as of an automobile as the mobile station 11. Further, since the computation for the position determination is carried out in the fixed station, the accuracy of the position determination is not lowered. Further, as the two receivers mounted on the mobile station 11 receive relatively large power signals, they can be made more compact than the transmitter, and an installation space for even the two receivers can be accordingly made small. Additionally, the first geostationary satellite 12 functions as a geostationary satellite for relaying a relatively small power signal from the mobile station 11, and the second geostationary satellite 13 functions only as a geostationary satellite for relaying a relatively large power signal from the fixed station 14. Accordingly, a general purpose communication satellite may be used as the second geostationary satellite 13, while the first geostationary satellite 12 is only necessary as a dedicated geostationary satellite for the purpose of the position determination.

Although the above preferred embodiment is applied to a transmission system for determining a position of an automobile such as a truck, the transmission system of the present invention may be applied to any other movable bodies such as a ship. Further, the transmission frequency as mentioned in the above preferred embodiment is merely exemplary, and it may be suitably selected according to a service condition.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A system for determining a position of a mobile station, comprising:

means incorporated in said mobile station for transmitting a position determination signal from said mobile station through a first geostationary satellite to a fixed station;

means incorporated in said fixed station for receiving said position determination signal;

means incorporated in said fixed station for transmitting a first reference signal through said first geostationary satellite to said mobile station;

means incorporated in said fixed station for transmitting a second reference signal through a second geostationary satellite to said mobile station;

means incorporated in said mobile station for receiving said first reference signal;

means incorporated in said mobile station for receiving said second reference signal;

means incorporated in said mobile station for measuring a first period of time from a transmitting timing of said position determination signal to a receiving timing of said first reference signal and measuring a second period of time from the transmitting timing of said position determination signal to a receiving timing of said second reference signal;

said transmitting means incorporated in said mobile station transmitting information of said first and second periods of time measured above through said first geostationary satellite to said fixed station; and means incorporated in said fixed station for computing the position of said mobile station according to the information of said first and second periods of time transmitted above.

2. A method of determining a position of a mobile station, comprising the steps of:

transmitting a position determination signal from said mobile station through a first geostationary satellite to a fixed station;

receiving said position determination signal in said fixed station;

transmitting a first reference signal from said fixed station through said first geostationary satellite to said mobile station after a first predetermined time has elapsed from a receiving timing of said position determination signal;

transmitting a second reference signal from said fixed station through a second geostationary satellite to said mobile station after a second predetermined time has elapsed from the receiving timing of said position determination signal;

receiving said first reference signal in said mobile station;

receiving said second reference signal in said mobile station;

measuring a first period of time from a transmitting timing of said position determination signal to a receiving timing of said first reference signal and a second period of time from the transmitting timing of said position determination signal to a receiving timing of said second reference signal, in said mobile station;

transmitting information of said first and second periods of time measured above through said first geostationary satellite to said fixed station; and computing the position of said mobile station according to the information of said first and second periods of time transmitted above, in said fixed station.

3. The transmission system as defined in claim 1, wherein said first reference signal contains a predetermined identification signal for identifying transmission through said first geostationary satellite, and said second reference signal contains a predetermined identification signal for identifying transmission through said second geostationary satellite.

* * * * *